United States Patent [19]
Zieres

[11] Patent Number: 5,853,200
[45] Date of Patent: Dec. 29, 1998

[54] HOSE COUPLING BOOT

[75] Inventor: Gary A. Zieres, 4 Whisenant Cr., Allen, Tex. 75013

[73] Assignee: Gary A. Zieres, Allen, Tex.

[21] Appl. No.: 632,263

[22] Filed: Apr. 15, 1996

[51] Int. Cl.$^6$ ..................................................... F16L 11/12
[52] U.S. Cl. .......................... 285/45; 285/419; 285/423; 285/921
[58] Field of Search ......................................... 285/45, 81

[56] References Cited

U.S. PATENT DOCUMENTS

| | | | |
|---|---|---|---|
| 3,030,601 | 4/1962 | Krebs | 285/45 X |
| 4,607,866 | 8/1986 | Erlichman | 285/45 |
| 4,615,543 | 10/1986 | Cannon | 285/45 |
| 4,741,559 | 5/1988 | Berghman | 285/45 |
| 5,002,314 | 3/1991 | Smith | 285/45 |
| 5,266,740 | 11/1993 | Hsu | 285/45 X |

FOREIGN PATENT DOCUMENTS

| | | | |
|---|---|---|---|
| 551448 | 1/1950 | Canada | 285/45 |
| 380074 | 3/1931 | France | 285/45 |

*Primary Examiner*—Dave W. Arola

[57] ABSTRACT

The improved hose coupling boot is an invention that because of its unique geometry and design, will substantially eliminate snags, and accidental disconnects of hose coupling joints. It will also substantially reduce debris build up and associated malfunction in hose connection joints. It is principally intended for use on pneumatic hoses used to power industrial pneumatic devices.

2 Claims, 2 Drawing Sheets

HOSE COUPLING BOOT

SUMMARY OF THE INVENTION

The present invention relates to improved boots for hose connections. The invention has particular application for use with quick release pneumatic hose coupling connections of the type used in industries such as construction, automotive maintenance, manufacturing, etc.

It is well known that hose quick release connections have existed for some time and are commercially available in a variety of embodiments. It is also known that in use, in order to take advantage of its inherent mobility, a typical for the user of a pneumatic powered tool will drag the pneumatic hose behind him. However, these quick release connections have been of the type and nature as to snag easily, become accidentally disconnected, and to malfunction from debris entering in the connection. Snagging and debris caused malfunction can be substantially counterproductive, and even cause increased likelihood of accidents due to causes such as extra desention and assention of ladders to untangle a snagged hose. Worse yet, is the danger of an accidental disconnection causing a loose high pressure hose connection to become a projectile and striking someone.

DESCRIPTION OF THE INVENTION

The present invention relates to an improved hose coupling boot having a hollow tubular shape with one portion of the tube being substantially cylindrical, and another portion of the tube being conical. The inner wall of the conical portion has a series of stepped shoulders.

In another embodiment of the improved hose coupling boot, the geometry is substantially similar to the first embodiment except that the hose boot is hinged on one side of a substantially centered parting plane and the boot has connecting teeth on the upper portion of the other side of the parting plane, and connecting sockets on the lower portion of the other side of the parting plane.

In use, the improved hose coupling boot is either slid over the hose of the male end of the quick connect coupling joint prior to coupling joint installation, and then slid back over the male portion of the coupling joint in the case of the non-hinged embodiment, or it is snapped over the male portion of a previously installed quick connect coupling joint in the case of the hinged embodiment.

Accordingly once in place, it is an object of the present invention to protect the sliding female member of the quick connect coupling joint from realizing any sliding loads by deflecting potential snagging or disconnecting objects and by causing the deflecting load to be transmitted to the male portion of the quick connect coupling joint rather than to the female portion of the quick connect coupling joint. It is also an object of the invention to protect the quick connect coupling joint from debris.

DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein:

FIG. 3 depicts the improved hose coupling boot installed over a typical hose quick connection coupling with the coupling in the connected position. FIG. 3 also indicates the direction of travel of the slide mechanism (from connected to disconnected) and the direction the hose is dragged.

DETAILED DESCRIPTION OF THE PREFERRED EMBODIMENT

Figure 1:
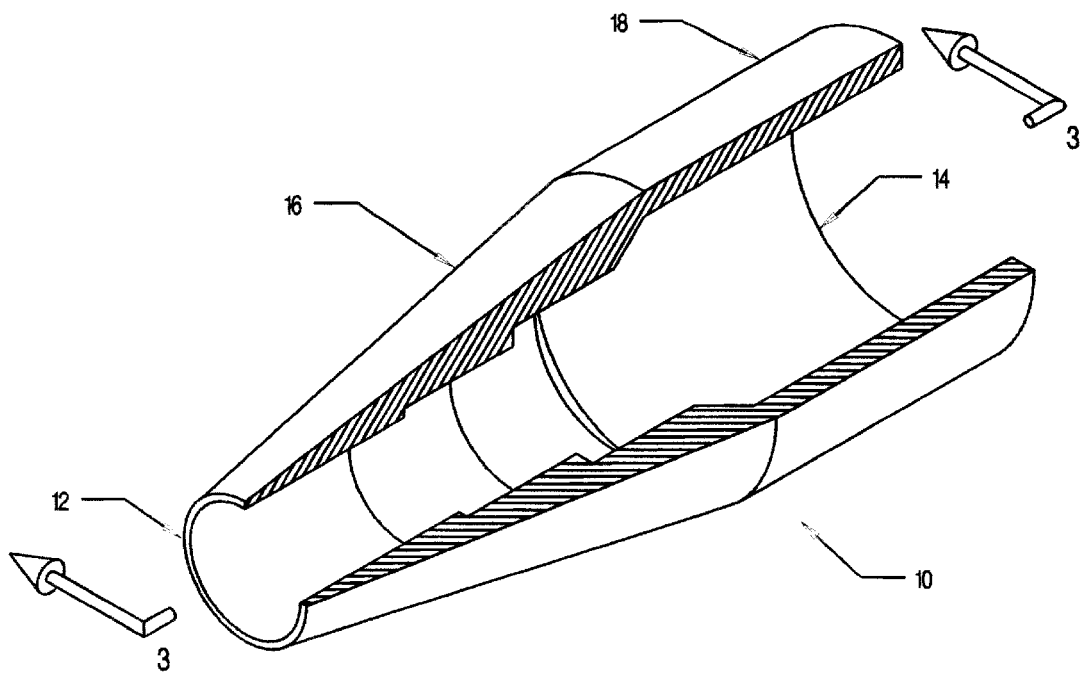
FIG. 1 is an isometric view of the non-hinged embodiment of the improved hose coupling boot. The near side upper portion of the boot is shown cut away.
Figure 2:
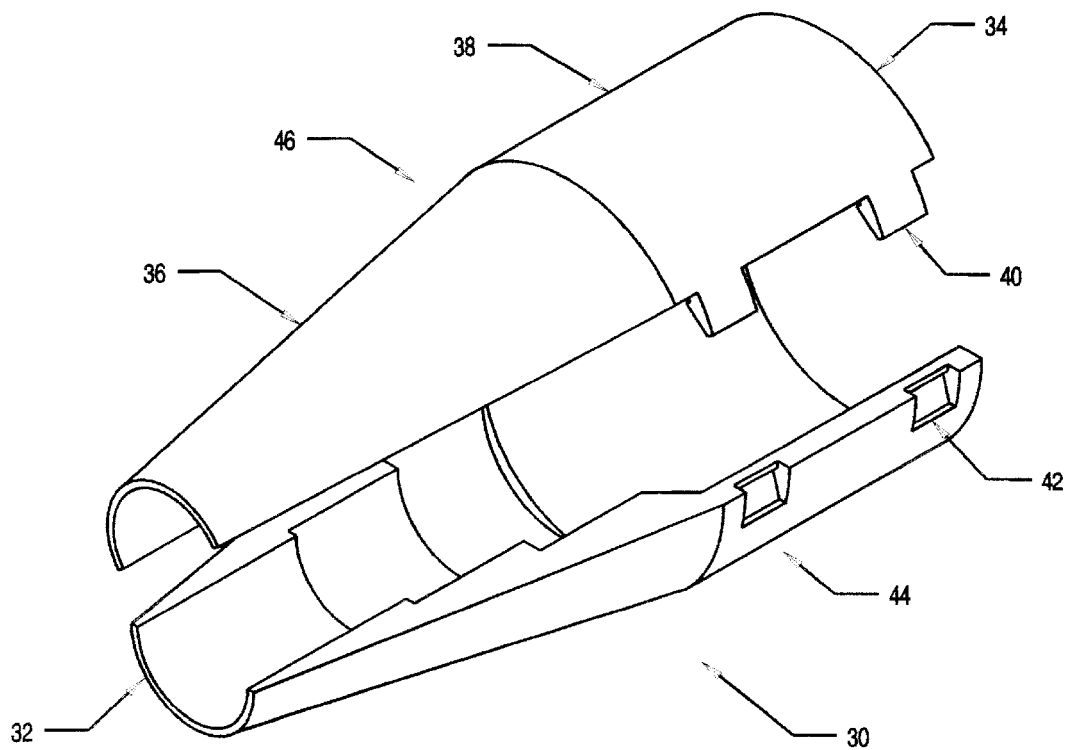
FIG. 2 is an isometric view of the hinged embodiment of the improved hose coupling boot. The upper portion of the boot is shown rotated up (opened) approximately 35 degrees from the bottom portion of the boot.

In order to facilitate the understanding of the present invention in reviewing the drawings accompanying the specification, a feature list is provided below. It is noted that like features are like numbered throughout all of the figures.

FEATURE TABLE

| Number | Feature |
| --- | --- |
| 10 | Non-hinged hose boot |
| 12 | Small open end, non-hinged hose boot |
| 14 | Large open end, non-hinged hose boot |
| 16 | Outer conical surface, non-hinged hose boot |
| 18 | Outer cylindrical surface, non-hinged hose boot |
| 20 | First interface shoulder, non-hinged hose boot |
| 22 | Second interface shoulder, non-hinged hose boot |
| 30 | Hinged hose boot |
| 32 | Small open end, hinged hose boot |
| 34 | Large open end, hinged hose boot |
| 36 | Outer conical surface, hinged hose boot |
| 38 | Outer cylindrical surface, hinged hose boot |
| 40 | Connecting tooth, hinged hose boot |
| 42 | Connecting socket, hinged hose boot |
| 44 | Lower half, hinged hose boot |
| 46 | Upper half, hinged hose boot |
| 50 | Hose coupling joint in general |
| 60 | Male end hose |
| 62 | Female end hose |
| 70 | Threaded hose end, male side |
| 72 | Threaded hose end interface shoulder |
| 80 | Threaded hose end, female side |
| 90 | Male coupling nipple |
| 92 | Male coupling nipple interface shoulder |
| 100 | Female coupling socket |
| 102 | Outer slide surface, coupling socket |
| 104 | Inner slide surface, coupling socket |
| 106 | Interface shoulder, coupling socket |
| 110 | Hose drag direction |
| 112 | Disconnect slide direction, coupling socket |

Referring now to the drawings, the invention is a hollow hose boot 10 that comprises a small open end 12, a large open end 14, an outer conical surface 16, an outer cylindrical surface 18, a first interface shoulder 20, and a second interface shoulder 22. In an alternative embodiment, the invention is a hollow hose boot 30 that comprises a lower half 44, an upper half 46, a hinge connecting the two halves, a small open end 32, a large open end 34, an outer conical surface 36, an outer cylindrical surface 38, at least one connecting tooth 40, at least one connecting socket 42, and interface shoulders substantially similar to that of the first embodiment.

The hose boot 10 fits over a standard hose coupling joint. The standard hose coupling joint comprises a male end hose 60, a female end hose 62, a male side threaded hose end 70, a threaded hosed end interface shoulder 72, a female side threaded hose end 80, a male coupling nipple 90, a male coupling nipple interface shoulder 92, a female coupling socket 100, a coupling socket outer slide surface 102, a coupling socket inner slide surface 104, and a coupling socket interface shoulder. In order to disconnect hose joint 50, female coupling socket 100 is slid in direction 112.

Figure 3:
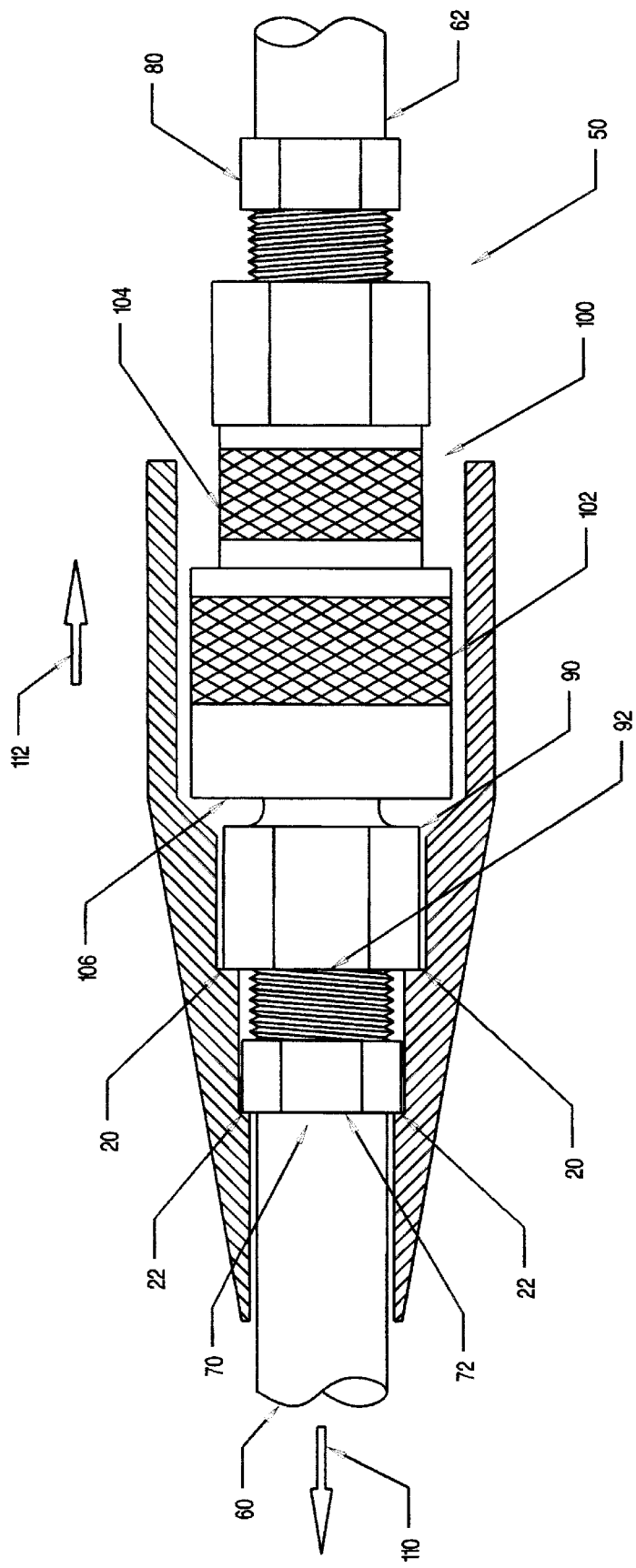
FIG. 3 is a side orthographic section cut of the improved hose coupling boot with the section taken at the center of the part (rotated 90 degrees counterclockwise to facilitated a larger scale figure).

As can be seen by reference to FIG. 3, objects that would otherwise cause hose joint 50 to snag when the hose is pulled in direction 110, are deflected by the conical surface 16 without snagging. Also as can be seen by reference to FIG. 3, the load path of objects against the joint 50 have been diverted from female socket interface flange 106 and directed to boot interface shoulders 20 and 22 and male coupling nipple interface shoulder 92 and threaded hose end interface shoulder 72 respectively, thus eliminating accidental disconnection. Also as can be seen by reference to FIG. 3, hose boot cylindrical portion 18 helps to prevent debris from entering hose joint 50, and more especially from debris entering between female coupling socket outer and inner slide surfaces 102 and 104, as well as from debris entering between female coupling socket 100 and male coupling nipple 90.

Lastly, the preferred method of fabrication would be injection molding for high volume low cost production. The material used could be any of a variety of materials such as polypropylene, polyester, nylon, etc. that are compatible with the injection molding process. The material selected of such robustness and durability as to be able to withstand harsh construction type environments.

While there is shown and described herein certain specific structure embodying the invention, it will be manifest to those skilled in the art that various modifications and rearrangements of the parts may be made without departing from the spirit and scope of the underlying inventive concept. The subject invention is not limited to the particular forms herein shown and described except insofar as indicated by the scope of the appended claims.

I claim:

1. A snag avoidance device for pneumatic hose couplings, said pneumatic hose couplings including a male coupling nipple connected to an outer coupling socket, said snag avoidance device defining an annular body, said annular body defining a first end and a second end and wherein said first end defines an externally tapered snag deflecting portion and said second end defines a cylindrical portion terminating in a blunt end, said second end of said annular body including an annular recess extending from said blunt end toward said first end having an internal diameter sufficient to freely receive said outer coupling socket therein, said first end including at least one annular recess extending therethrough and communicating with said annular recess of said second end and of smaller diameter than said recess of said second end and separated therefrom by an interface shoulder, said interface shoulder having a diameter less than the diameter of said male coupling nipple and engagable therewith for preventing removal of said snag avoidance device in the direction of said outer coupling socket.

2. The snag avoidance device of claim 1 wherein said annular body includes a first portion and a second portion, said first portion is hingedly connected to said second portion, and said first portion is snapingly engagable to said second portion, and wherein said engagement of said first portion to said second portion defines said annular body.

\* \* \* \* \*